No. 765,067. PATENTED JULY 12, 1904.
J. DERX.
STREET CAR FENDER.
APPLICATION FILED JAN. 29, 1904.
NO MODEL.
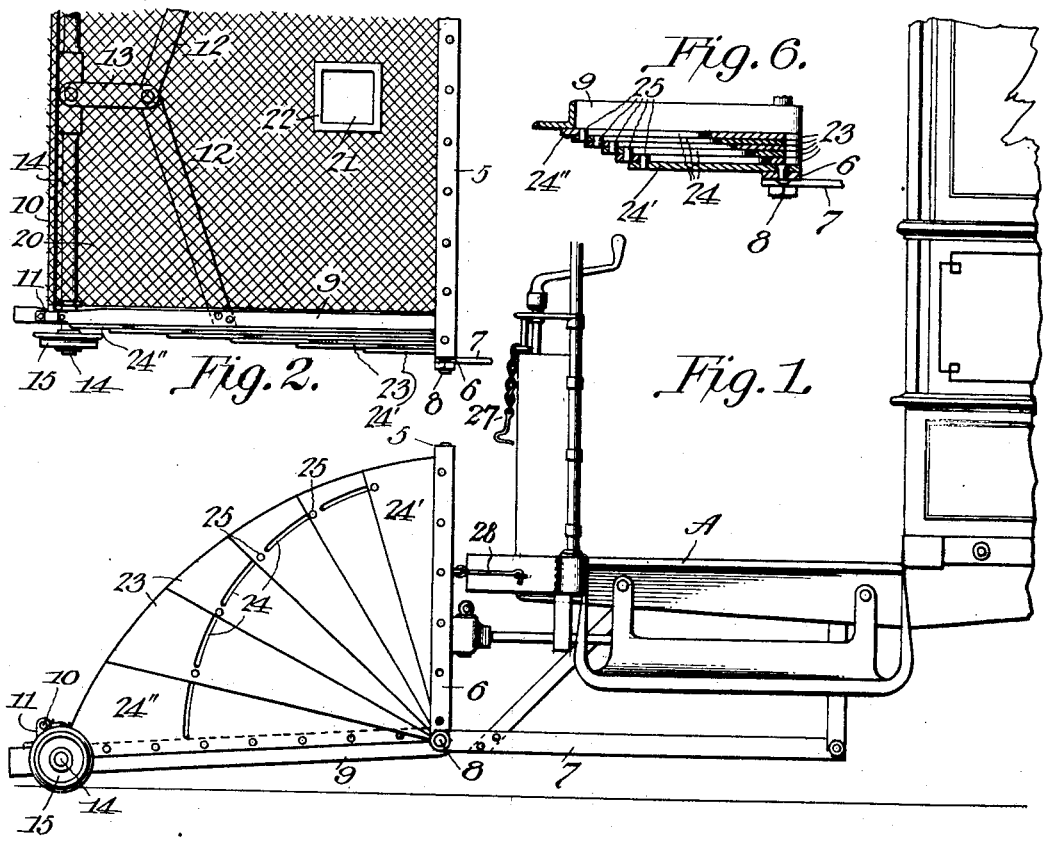
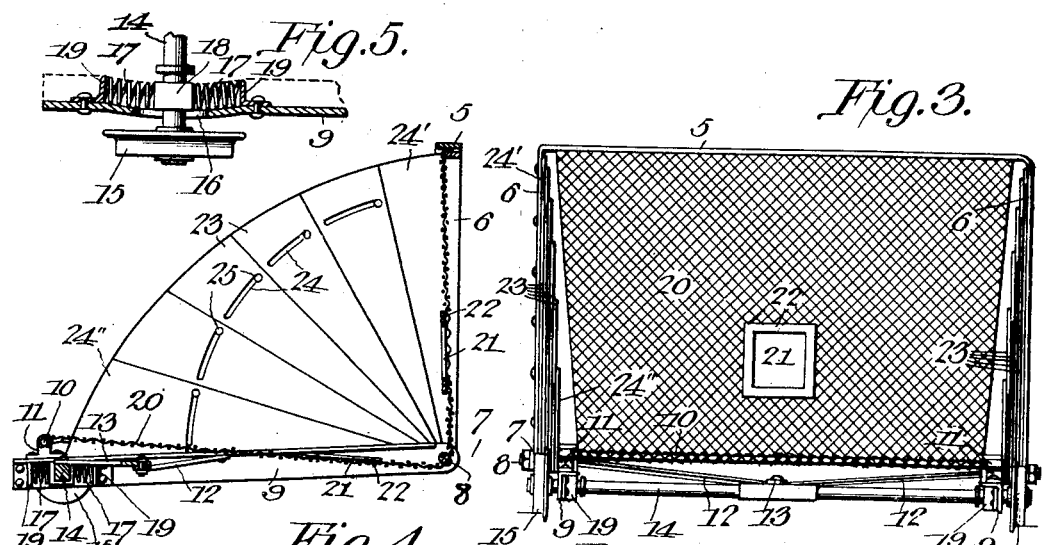
Jacob Derx, Inventor
by C. A. Snow & Co.
Attorneys
Witnesses No. 765,067.

Patented July 12, 1904.

UNITED STATES PATENT OFFICE.

JACOB DERX, OF ST. LOUIS, MISSOURI.

STREET-CAR FENDER.

SPECIFICATION forming part of Letters Patent No. 765,067, dated July 12, 1904.

Application filed January 29, 1904. Serial No. 191,112. (No model.)

*To all whom it may concern:*

Be it known that I, JACOB DERX, a citizen of the United States, residing at St. Louis, in the State of Missouri, have invented a new and useful Street-Car Fender, of which the following is a specification.

This invention relates to an improved fender for street-cars and other vehicles, and has for its object the production of an inexpensive, durable, and efficient device of this character which will automatically adjust itself to irregularities in the surface of the track and which may be compactly folded at the front side of the dashboard, so as to occupy the least possible space.

A further object of the invention is to provide a fender which will accommodate itself to the curves in the track and which will invariably pick up any object it may encounter, thereby rendering the device thoroughly effective in saving life and limb.

A still further object is to provide means whereby the cars may be readily coupled when the fender is in the folded position.

The invention consists in the construction and novel combination and arrangement of parts hereinafter fully described, illustrated n the accompanying drawings, and pointed out in the claims hereto appended, it being understood that various changes in form, proportions, and minor details of construction may be resorted to without departing from the principle or sacrificing any of the advantages of this invention.

In the accompanying drawings, forming a part of this specification, Figure 1 is a side elevation of a portion of a car, showing a fender constructed in accordance with my invention attached thereto. Fig. 2 is a top plan view of the fender detached. Fig. 3 is a front elevation of the same. Fig. 4 is a longitudinal sectional view. Fig. 5 is a detail sectional view of the front axle and bearing, and Fig. 6 is a horizontal section view of one side of the fender when the latter is folded.

Similar characters of reference indicate corresponding parts in all the figures of the drawings.

The frame of the fender consists of a yoke 5, to the parallel side arms 6 of which are rigidly secured in any suitable manner longitudinal braces 7, which connect the fender to the platform of the car A, as shown. Connecting the lower ends of the parallel arms 6 is a transversely-disposed rod or bar 8, and pivotally mounted on said bar are a pair of spaced horizontal arms 9, connected at their forward ends by a similar transverse bar 10, mounted in suitable brackets 11. Secured to the horizontal arms 9 are braces 12, having their inner ends rigidly secured to a link 13, which is in turn pivotally connected to the front axle 14 of the fender, said axle being provided with flanged wheels or rollers 15, adapted to engage the rails, as will be readily understood.

The horizontal arms 9 are preferably formed of angle-iron, as shown, and are provided with coincident slots or openings 16, adapted to allow a limited lateral play of the axle 14 in passing around curves, said axle being normally held parallel with the rod 8 by means of centering-springs 17, one end of each of which engages the squared shoulder 18 of the axle and the opposite end thereof a bracket 19, fastened in any suitable manner to the horizontal arms.

The fender may be provided with any preferred form of flexible network or operative surface 20, said network being preferably in the form of fine-mesh woven wire, one end of which is secured to the top of the yoke 5, the opposite end thereof passing under the traverse bar or rod 8, being fastened in any suitable manner to the opposite bar 10. The netting 20 is provided with openings 21, arranged at an angle to each other, as shown, and having their walls reinforced, as indicated at 22, said openings being adapted to register with each other when the fender is folded against the dashboard, so as to permit coupling of the cars, as will be readily understood.

The side walls of the fender consist of a plurality of overlapping plates 23, each provided with a segmental slot 24 and an outwardly extending pin or lug 25, adapted to engage the slot of the adjacent plate. The end plates 24' and 24'' are rigidly attached to the arms 6 and 9, respectively, and the intermediate plates fulcrumed on the rod or bar 8 to thereby permit said plates to slide one upon the other when the fender strikes an obstruction in the road-bed or when said fender is elevated to permit coupling, as clearly shown in Fig. 6 of the drawings.

The fender may be secured in the elevated position in any suitable manner, as by a hook and chain 27, and, if desired, a hook 28 may be employed in addition to the braces 7 for holding the yoke of the frame in a vertical position with respect to the car.

Having thus described the invention, what is claimed is—

1. The combination with a car, of a fender the side walls of which are formed of a plurality of pivotally-mounted rigid plates overlapping each other and having a common fulcrum.

2. The combination with a car, of a fender the side walls of which are formed of a plurality of pivotally-mounted rigid plates overlapping each other and having a common fulcrum, said plates being provided with interengaging means.

3. The combination with a car, of a fender the side walls of which are formed of a plurality of pivotally-mounted overlapping plates, each provided at one end with a segmental slot and a locking-pin, the locking-pin of one plate being adapted to engage the slot of the adjacent plate.

4. The combination with a car, of a fender comprising a stationary frame and a pivoted frame, and a plurality of pivotally-mounted rigid plates connecting said frames and forming the side walls of the fender.

5. A car-fender comprising a stationary frame, a movable frame pivoted thereto, and a plurality of pivotally-mounted rigid plates overlapping each other and connecting said frames at the opposite sides of the fender.

6. A car-fender comprising a stationary frame, a movable frame pivoted thereto, and a plurality of pivotally-mounted rigid plates overlapping each other and connecting said frames at the opposite sides of the fender, said plates being provided with interengaging means.

7. A car-fender comprising a stationary frame, a movable frame pivoted thereto, a flexible covering for said frames, and a plurality of pivotally-mounted rigid plates connecting the stationary and movable frames and forming the side walls of the fender.

8. A car-fender comprising a stationary frame, a movable frame pivoted thereto, an axle provided with wheels or rollers pivoted to the movable frame, and a flexible netting covering both frames, there being openings formed in the netting of each frame adapted to register with each other to thereby permit coupling of the cars.

9. A car-fender comprising a stationary frame and a movable frame, a rod forming a pivotal connection between said frames, a plurality of overlapping plates pivotally mounted on said rod and forming the side walls of the fender, an axle provided with wheels or rollers pivoted to the movable frames, and springs carried by said frame and arranged on each side of the axle.

10. A car-fender comprising a stationary frame and a movable frame, a rod forming a pivotal connection between said frames, a plurality of overlapping and interengaging plates pivotally mounted on said rod and forming the side walls of the fender, braces extending across the movable frame, an axle provided with wheels or rollers pivoted to said braces, springs carried by said frame and arranged on each side of the axle, and a flexible netting covering both of said frames.

11. A car-fender comprising a stationary frame and a movable frame, a rod forming a pivotal connection between said frames, and a plurality of rigid overlapping plates pivotally mounted on said rod and forming the side walls of the fender.

In testimony whereof I have signed my name to this specification in the presence of two subscribing witnesses.

JACOB DERX.

Witnesses:
   I. A. SCOTT,
   F. H. BENEKER.